United States Patent Office 3,318,940
Patented May 9, 1967

---

3,318,940
3-(2-HYDROXYPHENYL)PROPYL THIOLACETATE
Elbert C. Ladd, New Haven, Conn., assignor to United States Rubber Company, New York, N.Y., a corporation of New Jersey
No Drawing. Original application May 31, 1962, Ser. No. 198,720, now Patent No. 3,193,583, dated July 6, 1965. Divided and this application Feb. 23, 1965, Ser. No. 434,676
1 Claim. (Cl. 260—455)

This application is a division of my application Serial No. 198,720, filed May 31, 1962, now U.S. Patent No. 3,193,583.

This invention relates to new chemical compounds, namely 3-(2-hydroxyphenyl)propyl thiolacetate and 2-(3'-mercaptopropyl)-phenol, and to methods of preparing same. The instant compounds may be represented by the formulas:

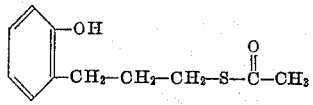

I. 3-(2-hydroxyphenyl)propyl thiolacetate

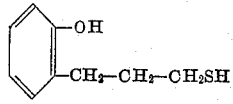

II. 2-(3'-mercaptopropyl)phenol

I have found that 2-(3'-mercaptopropyl)phenol can be prepared by a two-step process utilizing the intermediate, 3-(2-hydroxyphenyl)propyl thiolacetate, that is formed as a result of the first step.

Step 1 consists of reacting thiolacetic acid with 2-allylphenol to give 3-(2-hydroxyphenyl)propyl thiolacetate. The reaction may be represented as follows:

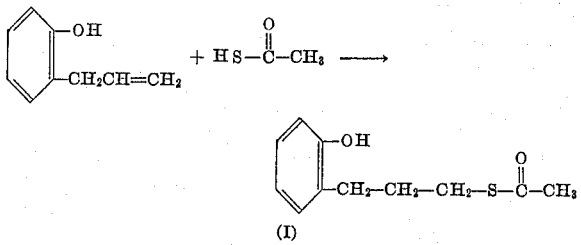

This reaction is easily carried out by bringing together approximately equimolar amounts of the two reagents at ambient temperatures whereupon an exothermic reaction occurs. Preferably, the reaction is run in the presence of a free-radical catalyst, such as the conventional peroxide types (e.g., ascaridole) or U.V. light. The product is distilled off as a colorless liquid. This new compound, 3-(2-hydroxyphenyl)propyl thiolacetate, may be used as an intermediate for the preparation of 2-(3'-mercaptopropyl)phenol and is, therefore, a valuable tool for the chemist in organic synthesis reactions.

Step 2 consists in converting the thiolacetate obtained from Step 1 to 2-(3'-mercaptopropyl)phenol by alcoholysis. The reaction may be carried out by heating the thiolacetate with an acidified alcohol, distilling off the alcohol acetate as formed, and thereafter distilling off 2-(3'-mercaptopropyl)phenol from the reaction mixture. The reaction in Step 2 can be portrayed as follows:

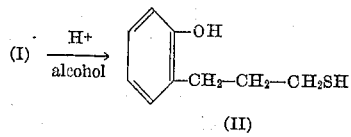

The compound, 2-(3'-mercaptopropyl)phenol, may be used as a modifying agent for olefinic rubbers.

The following examples illustrate the invention in more detail.

EXAMPLE I

Preparation of 3-(2-hydroxyphenyl)propyl thiolacetate:
Thirty-three grams of thiolacetic acid was slowly stirred into 59 grams of 2-allylphenol at room temperature whereupon the temperature spontaneously rose to 60° C. After the temperature began to subside, a few drops of ascaridole were added. The temperature again spontaneously rose to 80° C. Reaction was complete when addition of further ascaridole caused no temperature rise. Distillation of the product gave 76 grams of a colorless liquid, boiling at 161–4° C./3 mm. and having an nD of 1.5624, which was identified as 3-(2-hydroxyphenyl)propyl thiolacetate.

Analysis for $C_{11}H_{14}SO_2$.—Calculated: percent S, 15.19. Found: percent S, 15.2.

EXAMPLE II

Conversion of the thiolacetate compound to 2-(3'-mercaptopropyl)phenol:
To 75 ml. of absolute methanol and 1 ml. of concentrated sulfuric acid were added seventy grams of the 3-(2-hydroxyphenyl)propyl thiolacetate obtained from Example I. The mixture was heated to reflux under a 6″ helices packed column, connected to a partial take off head until the head temperature reached 64° C. At this point, 35 ml. of methyl acetate had collected. Further distillation of the still contents yielded 41 grams of a colorless liquid, boiling at 126–7° C./3 mm. and having an $n_D^{25}$ of 1.5745. The product was identified as 2-(3'-mercaptopropyl)phenol.

Analysis for $C_9H_{12}SO$.—Calculated: percent S, °18.93. Found: percent S, 19.44.

EXAMPLE III

This example illustrates the reaction of an olefinic rubber with the 2-(3'-mercaptopropyl)phenol of this invention. Ten grams of 2-(3'-mercaptopropyl)phenol were added to 100 grams of a styrene-butadiene copolymer rubber having a styrene content of about 20 percent on a cool two-roll mill. The mass was then heated in a mold at 293° F. for one hour. The mass was allowed to cool and then extracted with ethanol in a Soxhlet extractor until all of the free 2(3'-mercaptopropyl)phenol had been removed. Analysis of the extracted rubber showed that 0.96% sulfur (or 50% of the total sulfur available) had combined with the rubber.

EXAMPLE IV

This example further shows the use of 2-(3'-mercaptopropyl)phenol as a modifying agent for olefinic rubbers. A commercial styrene-butadiene copolymer rubber with a styrene content of about 20 percent (SBR–1500) was compounded with 6 parts of 2-(3'-mercaptopropyl)phenol.

Compounding was carried out in the conventional manner on a cool two-roll mill followed by heat treatment of the mix for one hour in a press at 293° F. Upon cooling, the rubber mix was placed again on the two-roll mill to which were added 50 parts, based on one hundred parts of rubber, of a high abrasion furnace black (marketed under the registered trademark Philblack O and 5 parts of hexamethylenetetramine. By way of comparison, a similar stock was compounded except that the 2-(3'-mercaptopropyl)phenol was left out of the mix. Both stocks were cured for one hour at 293° F. and tested by the conventional testing methods used for rubber.

| Stock | Parts by Weight | |
|---|---|---|
| | 1 | 2 |
| SBR-1500 | 100 | 100 |
| 2-(3'-mercaptopropyl)phenol | 6 | |
| Philblack O | 50 | 50 |
| Hexamethylenetetramine | 5 | 5 |

The following table shows the results of tests on the cured samples:

| Physical Properties | 1 | 2 |
|---|---|---|
| Tensile Strength (p.s.i.) | 3,040 | No Cure. |
| Elongation at Break (percent) | 410 | Do. |
| Modulus at 300% (p.s.i.) | 1,950 | Do. |
| Hardness (Shore A) | 73 | Do. |

Having thus described my invention, what I claim and desire to protect by Letters Patent is:

3-(2-hydroxyphenyl)propyl thiolacetate.

No references cited.

CHARLES B. PARKER, *Primary Examiner.*

BERNARD BILLION, *Assistant Examiner.*